United States Patent [19]

Mark, deceased et al.

[11] Patent Number: 4,788,276

[45] Date of Patent: Nov. 29, 1988

[54] COPOLYESTER CARBONATE WITH CYCLOALKYLPHENYL END GROUPS

[75] Inventors: Victor Mark, deceased, late of Evansville, Ind., by Carol M. Mark,; legal representatives Ester H. Mark, Springville, N.Y.

[73] Assignee: General Electric Company, Mt. Vernon, Ind.

[21] Appl. No.: 51,805

[22] Filed: May 20, 1987

Related U.S. Application Data

[62] Division of Ser. No. 797,410, Nov. 12, 1985, Pat. No. 4,699,971.

[51] Int. Cl.$^4$ ............................................. C08G 63/64
[52] U.S. Cl. .................................. 528/179; 528/176; 528/274
[58] Field of Search ..................... 528/179, 176, 274

[56] References Cited

U.S. PATENT DOCUMENTS 4,699,971 10/1987 Mark et al. ..................... 528/196

*Primary Examiner*—Harold D. Anderson
*Attorney, Agent, or Firm*—Martin B. Barancik

[57] ABSTRACT

Thermoplastic aromatic polycarbonate containing the polymerized reaction products of (i) at least one dihydric phenol, (ii) a carbonate precursor, and (iii) at least one end-capping agent represented by the formula

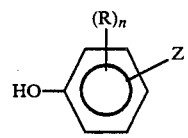

wherein:
R is independently selected from alkyl radicals;
Z is a cycloalkyl radical; and
n is an integer having a value of from 0 to 4 inclusive.

2 Claims, No Drawings

COPOLYESTER CARBONATE WITH CYCLOALKYLPHENYL END GROUPS

This is a division of copending application Ser. No. 797,410, filed Nov. 12, 1985, now U.S. Pat. No. 4,699,971.

BACKGROUND OF THE INVENTION

The importance of end-capping or terminating polycarbonates with certain end or terminal groups is well known. Polycarbonates which are not so end-capped are generally insufficiently heat stable since the free phenolic end groups provide reactive sites which are generally detrimental to the thermal stability of the polycarbonate. Well known and conventionally used end-capping agents include phenol compounds such as p-tertiary-butyl phenol, chroman-I, and phenol itself.

The prior art also discloses other types of compounds that are effective end-capping agents for the carbonate polymers. These end-capping agents include the alkylphenols disclosed in U.S. Pat. No. 4,269,964 and Japanese Patent Publication No. 34992/76; the alkanol amines disclosed in U.S. Pat. No. 3,085,992; the imides disclosed in U.S. Pat. No. 3,399,172; aniline and methyl aniline as disclosed in U.S. Pat. No. 3,275,601; and the primary and secondary amines disclosed in U.S. Pat. No. 4,001,184. Some other end-capping agents described in the prior art include the aromatic amines disclosed in U.S. Pat. No. 3,028,365; and the ammonium compounds, ammonia, primary cycloalkyl amines, and primary aliphatic or aralkyl amines disclosed in U.S. Pat. No. 4,111,910.

However, according to Schnell, *Chemistry and Physics of Polycarbonates* (1964), page 138, ammonium hydroxide and amines saponify polycarbonates back to the monomers. This is supported by Bolgiano in U.S. Pat. No. 3,223,678 wherein it is disclosed that small amounts of amines such as monoethanolamine and morpholine break or degrade polycarbonates into lower molecular weight polycarbonates. Thus, this area of chemistry is generally not completely understood and is one where the empirical approach is still generally the method used to determine whether a particular compound or class of compounds will function as an effective end-capping agent for polycarbonates. This area is still further complicated by the fact that even though a particular compound may be an effective chain-terminating agent for polycarbonates, its presence in the polymer chain may adversely affect some of the advantageous physical properties of polycarbonates.

SUMMARY OF THE INVENTION

The instant invention is directed to polycarbonates containing cycloalkenylphenyl end or terminal groups. These polycarbonates exhibit good thermal properties and improved processability.

DESCRIPTION OF THE INVENTION

In accordance with the instant invention there are provided polycarbonate resins containing cycloalkenylphenyl terminal or end-groups. These polycarbonates exhibit good thermal properties, e.g., heat distortion temperatures, and good processability.

The cycloalkenylphenols which provide the cycloalkenylphenyl terminal or end-groups may be represented by the general formula

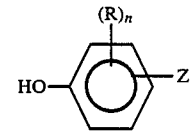

wherein:
R is independently selected from alkyl radicals;
Z is a cycloalkyl radical containing from 6 to about 16 ring carbon atoms; and
n is an integer having a value of from 0 to 4 inclusive.

The alkyl radicals represented by R are preferably those containing from 1 to about 5 carbon atoms. These alkyl radicals may be straight chain or branched alkyl radicals. Some illustrative non-limiting examples of these alkyl radicals include methyl, ethyl, propyl, isopropyl, butyl, tertiarybutyl, pentyl, and neopentyl.

The preferred cycloalkyl radicals represented by Z are those containing from 8 to about 16 ring carbon atoms, with those containing from 10 to about 16 ring carbon atoms being more preferred. The most preferred cycloalkyl radicals are those containing from 12 to about 16 ring carbon atoms.

Particularly useful cycloalkylphenols of Formula I are those wherein the cycloalkyl radical represented by Z is in the para position relative to the hydroxyl radical, i.e., those compounds of Formula I represented by the general formula

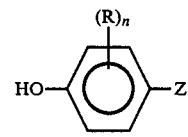

wherein R, Z, and n are as defined hereinafore.

Preferred compounds of Formula Ia are those wherein n is zero, or those wherein n is 1 or 2 and the alkyl substituents represented by R are in the ortho position relative to the hydroxyl radical.

These cycloalkylphenols, which act as the chain stoppers or terminators, are well known compounds which are generally commercially available or may be readily prepared by known conventional methods.

Some illustrative non-limiting examples of the cycloalkylphenols are set forth in Table I.

TABLE I

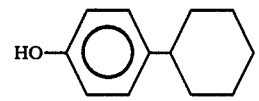

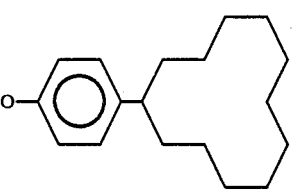

TABLE I-continued

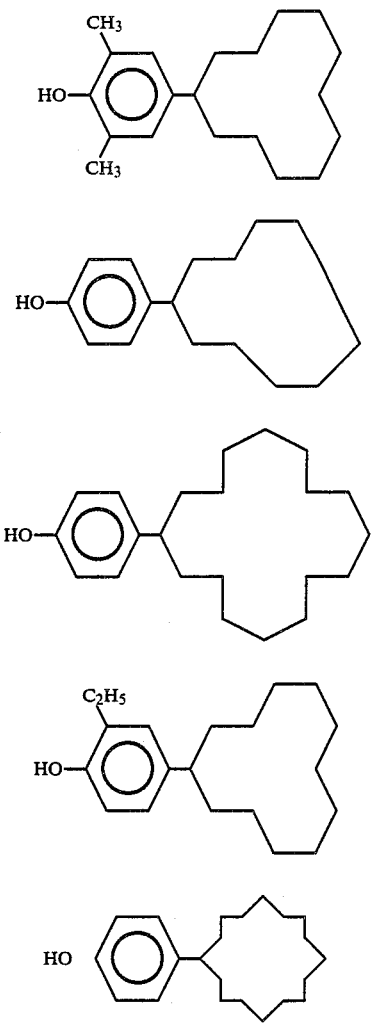

The polycarbonate resins of the instant invention contain at least one terminal or end-group, which is derived from the end-capping agents of Formula I, represented by the general formula

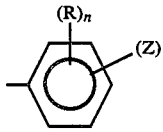  II.

wherein R, n and Z are as defined hereinafore.

The carbonate polymers of the instant invention, i.e., polycarbonates containing at least one terminal group of Formula II, may be conveniently prepared by a number of different well known conventional methods. One of these methods includes introducing an end-capping or chain terminating amount of at least one compound of Formula I into the polymer forming reaction as one of the reactants. These polycarbonate forming reactions are well known in the art and include such conventional processes as the interfacial polymerization reaction, the pyridine process, and melt polymerization.

In general these reactions involve reacting (i) at least one dihydric phenol, (ii) a carbonate precursor, and (iii) an end-capping amount of at least one end-capping agent of Formula I.

The amount of the cycloalkylphenol of Formula I employed is a chain terminating or end-capping amount. By chain terminating or end-capping amount is meant an amount effective to form polycarbonates of a molecular weight exhibiting a useful range of physical properties. That is to say an amount effective to terminate the chain length of the polymer before the molecular weight of the polymer becomes too high and consequently the polycarbonate resin becomes too viscous for any practical application, but insufficient to terminate the polymer chain before a polycarbonate resin of useful molecular weight is formed. Generally this amount is from about 0.1 to about 10 mole percent based on the amount of dihydric phenol used, and preferably from about 0.5 to about 7 mole percent.

In carrying out the instant invention only one cycloalkylphenol may be used. In this case substantially all of the end or terminal groups will be the same. Alternatively, a mixture of two or more different chain terminating agents of Formula I may be employed. In this instantnce, assuming that these different cycloalkylphenols exhibit generally equivalent reactivities, a statistical mixture of carbonate polymers containing different end or terminal groups will result.

The high molecular weight aromatic polycarbonate resins are well known compounds which are described, along with methods for their preparation, inter alia, in U.S. Pat. Nos. 3,989,672, 3,275,601 and 3,028,365, all of which are incorporated herein by reference.

They may be conveniently prepared by the reaction of at least one dihydric phenol and a carbonate precursor. The dihydric phenols employed in the practice of this invention are known dihydric phenols which may be represented by the general formula

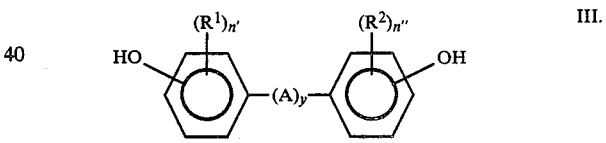 III.

wherein:
R$^1$ is independently selected from halogen, monovalent hydrocarbon, and monovalent hydrocarbonoxy radicals;
R$^2$ is independently selected from halogen, monovalent hydrocarbon, and monovalent hydrocarbonoxy radicals;
A is selected from divalent hydrocarbon radicals, —O—, —S—, —S—S—,

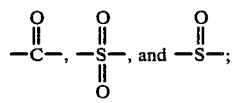

n' and n" are independently selected from integers having a value of from 0 to 4 inclusive; and
y is either zero or one.

The monovalent hydrocarbon radicals represented by R$^1$ and R$^2$ include the alkyl, cycloalkyl, aryl, aralkyl, and alkaryl radicals.

The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The preferred halogen radicals represented by $R^1$ and $R^2$ are chlorine and bromine.

The monovalent hydrocarbonoxy radicals may be represented by the general formula $-OR^3$ wherein $R^3$ has the same meaning as $R^1$ and $R^2$. The preferred hydrocarbonoxy radicals are the alkoxy and the aryloxy radicals.

The divalent hydrocarbon radicals represented by A include the alkylene, alkylidene, cycloalkylene, and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

Some illustrative non-limiting of suitable dihydric phenols include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
1,1-bis(4-hydroxyphenyl)decane;
1,4-bis(4-hydroxyphenyl)butane;
p,p'-dihydroxydiphenyl;
bis(4-hydroxyphenyl)ether; and
4,4'-thiodiphenol.

Other useful dihydric phenols are described, inter alia, in U.S. Pat. Nos. 3,028,365, 2,999, 835, 3,148,172, 3,271,368, 2,991,273, 3,271,367, 3,280,078, 3,014,891 and 2,999,846, all of which are incorporated herein by reference.

The carbonate precursors employed in the practice of the instant invention include the carbonyl halides, the bishaloformates, and the diarylcarbonates. The carbonyl halides include carbonyl bromide, carbonyl chloride, and mixtures thereof. Typical of the diarylcarbonates are diphenyl carbonate; di(halophenyl)carbonates such as di(chlorophenyl)carbonate, di(bromophenyl) carbonate, di(trichlorophenyl)carbonate, and di(tribromophenyl)carbonate; di(alkylphenyl)carbonates such as di(tolyl)carbonate; dinaphthyl carbonate; di(halonaphthyl)carbonates; and naphthyl phenyl carbonate. The bishaloformates suitable for use herein include the bishaloformates of dihydric phenols such as the bischloroformates of hydroquinone and bisphenol-A; the bishaloformates of glycols such as the bischloroformates of ethylene glycol, neopentyl glycol, and polyethylene glycol.

The polycarbonates of the instant invention contain at least one recurring structural unit represented by the formula

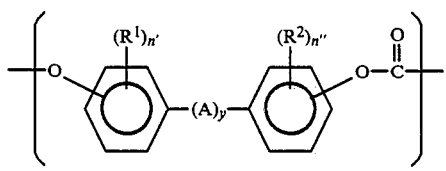

IV.

wherein A, $R^1$, $R^2$, n', n" and y are as defined hereinafore.

The polycarbonates of the instant invention also contain terminal or end groups represented by the general formula

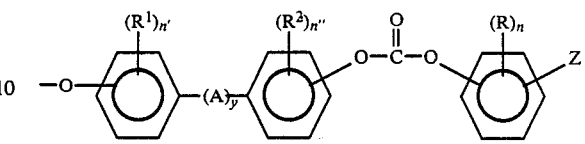

wherein A, R, $R^1$, $R^2$, A, n, n', n" and y are as defined hereinafore.

In a preferred embodiment the instant polymers will contain two moles of end-groups of Formula II per mole of carbonate polymer.

The instant polycarbonates are high molecular weight aromatic carbonate polymers having an intrinsic viscosity, as determined in methylene chloride at 25° C. of from about 0.4 to about 1.5 dl/gm, preferably from about 0.45 to about 1.0 dl/gm. These polycarbonate generally have a weight average molecular weight of from about 10,000 to about 200,000, preferably from about 20,000 to about 100,000.

Another emdodiment of the instant invention involves using the cycloalkylphenol end-capping agents of Formula I in conjunction with the conventional known end-capping or chain terminating agents such as chroman-I, phenol, and p-tertiarybutylphenol. In such case a statistical mixture of polymers containing different terminal groups will be formed. The amounts of the various terminal groups present will depend on the relative amounts and relative reactivities of the various chain terminating agents used.

Also included with the scope of the instant invention are the high molecular weight thermoplastic randomly branched polycarbonates. These randomly branched polycarbonates may be prepared by utilizing a minor amount of a branching agent. These branching agents are well known in the art and are generally organic polyfunctional aromatic compounds containing at least three functional groups which may be hydroxyl, carboxyl, carboxylic anhydride, haloformyl and mixtures thereof. Some illustrative non-limiting examples of these branching agents include trimellitic anhydride, trimellitic acid, trimellityl trichloride, 4-chloroformyl phthalic anhydride, pyrommelitic acid, pyromellitic dianhydride, trimesic acid, and benzophenonetetracarboxylic acid. Some other useful branching agents are disclosed in U.S. Pat. Nos. 3,635,895, 4,001, 184 and 4,204,047, all of which are incorporated herein by reference.

A convenient method of preparing the instant polycarbonate is the interfacial polymerization process. This process involes the coreaction of (i) at least one dihydric phenol of Formula III, (ii) a carbonate precursor such as phosgene, and (iii) an end-capping amount, i.e., from about 0.1 to about 10 mole percent, based on the moles of dihdric phenol used, of at least one end-capping agent of Formula I. The reaction is carried out in the presence of two different liquid phases which are immiscible with each other and which consititute two solvent media. Normally one of these liquid phases is an alkaline aqueous medium while the other liquid phase is an organic medium such as methylene chloride. Also present are catalysts which are conventionally used in the interfacial polymerization process of forming polycarbonates. These catalysts include, but are not limited to, tertiary amines such as triethylamine, quaternary ammonium compounds, and quaternary phosphonium compounds.

Also included within the scope of the instant invention are the copolyester-carbonate resins which are described, inter alia, in U.S. Pat. No. 3,169,121, which is incorporated herein by reference. These copolyester-carbonates may be prepared by reacting (i) at least one dihydric phenol, (ii) a carbonate precursor, (iii) at least one compound of Formula I, and (iv) at least one ester precursor.

The carbonate polymers of the instant invention may optionally have admixed therewith the commonly known and used additives such as antioxidants; inert fillers such as clay, mica, talc, and glass; impact modifiers; ultraviolet radiation absorbers such as benzophenones; hydrolytic stabilizers such as the epoxides taught is U.S. Pat. Nos. 3,489,716, 4,138,379, and 3,839,247, all of which are incorporated herein by reference; color stabilizers such as the organophosphites disclosed in U.S. Pat. Nos. 3,305,520 and 4,118,370, both of which are incorporated herein by reference; and flame retardant agents.

Some particularly useful flame retardant agents are the alkali and alkaine earth metal salts of organic sulfonic acids. These types of flame retardant agents are disclosed, inter alia, in U.S. Pat. Nos. 3,933,734, 3,948,851, 3,926, 908, 3,919,167, 3,909,490, 3,953,396, 3,931,100, 3,978,024, 3,953,399, 3,917,559, 3,951,910 and 3,940,366, all of which are incorporated herein by reference.

PREFERRED EMBODIMENT OF THE INVENTION

The following examples are presented to more fully and clearly illustrate the invention. Although the examples set forth the best mode presently known to practice the invention they are intended to be and should be considered as illustrative rather than limiting the invention. In the examples all parts and percentages are by weight unless otherwise indicated.

EXAMPLE 1

This example illustrates the preparation of p-cyclododecyl phenol end-capping agent of the instant invention.

To a reaction flask equipped with a mechanical stirrer, thermometer, and distillation apparatus there are added 470.55 grams (5 moles) of phenol, 92.16 grams (0.5 mole) of cyclododecanol, and 80 milliliters of methylene chloride. The reaction mixture is heated at about 28° C. until all of the solids are dissolved. The reaction mixture is then cooled to 20° C. and HCl is gradually introduced into the reaction mixture while stirring said reaction mixture. After about 5.5 hours 10 milliliters of methanesulfonic acid are added to the reaction mixture. The reaction vessel is placed in a hot water bath maintained at a temperature of 100° C. The methylene chloride and phenol are removed from the reaction mixture by distillation. The residue is washed with water. Sufficient methanol is added to the residue to form a solution. The methanol is stripped from the solution under vacuum. The resultant solids of p-cyclododecyl phenol weight 92.36 grams.

The following examples illustrate polycarbonates which are end-capped with conventional prior art chain terminating agents. These examples are presented for comparative purposes only.

EXAMPLE 2

To a reaction vessel there are added 280 milliliters of water, 350 milliliters of methylene chloride, 1.4 milliliter (0.01 mole) of triethylamine, 0.25 mole of bisphenol-A, and 4.6 mole percent of p-tertiarybutyl phenol chain stopper. With stirring the pH is raised to about 10 by the addition of 25% aqueous sodium hydroxide. Phosgene is introduced into the reaction vessel at the rate of one gram per minute for a 30 minutes with the pH maintained at 9.5 to 11.5 by the use of the aqueous caustic solution. The pH is adjusted to 11 at the end of the reaction. The resin layer is separated from the brine layer, washed with dilute aqueous HCl, then twice with distilled water. The resin is then precipitated with methanol.

The Heat Distortion Temperature Under Load of test bars formed from this resin is determined in accordance with modified ASTM D-648 test method. The results are set forth in Table I.

Also determined for this resin is the Kasha Index (KI). The KI is an indication or measurement of the processability of the resin. The lower the KI the greater the melt flow of the resin and the better the processability of the resin. Basically the KI is a measurement of the melt viscosity of the resin. The procedure for determining the KI of the resin is as follows: 7 grams of resin pellets, dried a minimum of 90 minutes at 125° C.,are added to a modified Tinius-Olsen model T3 melt indexer; the temperature in the indexer is maintained at 300° C. and the resin is heated at this temperature for 6 minutes; after this 6 minute heating period the resin is forced through a 0.04125 inch radius orifice using a plunger of 0.1865 radius and an applied force of 17.7 pounds; the time required for the plunger to travel 2 inches is measured in centiseconds and this is reported as the KI. The higher the KI the greater the melt viscosity of the resin and the more difficult it is to process. The KI is set forth in Table II.

EXAMPLE 3

The procedure of Example 2 is substantially repeated except that the 4.6 mole percent of p-tertiarybutyl phenol chain-stopper is replaced with 4.6 mole percent of chroman-I chain-stopper. The Heat Distortion Temperature Under Load (DTUL) and KI of this resin are determined and the results are set forth in Table II.

The following example illustrates a polycarbonate resin of the instant invention.

EXAMPLE 4

The procedure of Example 2 is substantially repeated except that the 4.6 mole percent of p-tertiarybutyl phenol chain-stopper is replaced with 4.6 mole percent of p-cyclododecyl phenol chain-stopper prepared substantially in accordance with the procedure of Example 1.

The DTUL and KI of this resin are determined and the results are set forth in Table II.

TABLE II

| Example No. | DTUL (°C. at 264 psi) | KI ($1 \times 10^3$ csec.) |
|---|---|---|
| 2 | 134 | 1.5 |
| 3 | 138 | 2.4 |
| 4 | 136 | 1.5 |

As illustrated by the data in Table II the polycarbonate resin of the instant invention (Example 4) has a better DTUL than the prior art p-tertiarybutyl phenol end-capped polycarbonate resin (Example 2) while exhibiting substantially the same KI (processability) as said prior art polycarbonate. While the polycarbonate resin of the instant invention has a lower DTUL than a prior art polycarbonate which is end-capped with chroman-I (Example 3) it exhibits better processability than the chroman-I end-capped resin of Example 3.

The instant polycarbonates may be used in the preparation of shaped articles, molded articles, and glazing products.

The foregoing detailed description of the instant invention has been given for clearness of understanding only and no unnecessary limitations are to be understood therefrom. The invention is not limited to the exact details shown and described, for obvious modifications will occur to those skilled in the art.

What is claimed is:

1. An aromatic copolyestercarbonate having an isophthalate group, a terephthalate group, or a mixture of isophthalate and terephthalate groups and containing at least one terminal group represented by the formula

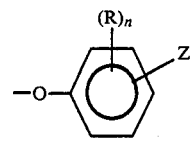

wherein
R is independently selected from alkyl radicals;
Z represents a cycloalkyl radical; and
n is an integer having a value of from 0 to 4 inclusive.

2. The copolyestercarbonate of claim 1 wherein n is zero.

* * * * *

UNITED STATES PATENT AND TRADEMARK OFFICE
CERTIFICATE OF CORRECTION

PATENT NO. : 4,788,276

DATED : November 29, 1988

INVENTOR(S) : Victor Mark

It is certified that error appears in the above-identified patent and that said Letters Patent is hereby corrected as shown below:

Column 6, line 61, "dihdric" should read --dihydric--.

Signed and Sealed this

Thirty-first Day of July, 1990

Attest:

HARRY F. MANBECK, JR.

Attesting Officer

Commissioner of Patents and Trademarks